United States Patent
Metral et al.

(10) Patent No.: US 9,765,744 B2
(45) Date of Patent: Sep. 19, 2017

(54) STARTER MOTOR WITH DRIVE ASSEMBLY FITTED WITH A COUPLING SYSTEM FOR COUPLING A PINION MOUNTED FREELY ON ITS ROTOR SHAFT, AND ASSOCIATED METHOD

(75) Inventors: Jean-Sébastien Metral, La Verpilliere (FR); Guillaume Seillier, La Verpilliere (FR); Vincent Villard, Villefontaine (FR)

(73) Assignee: Valeo Equipements Electriques Moteur (FR)

( * ) Notice: Subject to any disclaimer, the term of this patent is extended or adjusted under 35 U.S.C. 154(b) by 611 days.

(21) Appl. No.: 13/810,633

(22) PCT Filed: Jul. 27, 2011

(86) PCT No.: PCT/FR2011/051807
§ 371 (c)(1),
(2), (4) Date: Feb. 15, 2013

(87) PCT Pub. No.: WO2012/022897
PCT Pub. Date: Feb. 23, 2012

(65) Prior Publication Data
US 2013/0147207 A1    Jun. 13, 2013

(30) Foreign Application Priority Data
Jul. 27, 2010 (FR) ...................................... 10 56174

(51) Int. Cl.
*F02N 15/06* (2006.01)
*F02N 11/08* (2006.01)
(Continued)

(52) U.S. Cl.
CPC .......... *F02N 11/0851* (2013.01); *F02N 11/00* (2013.01); *F02N 11/0855* (2013.01);
(Continued)

(58) Field of Classification Search
CPC ... Y10T 74/132; Y10T 74/134; Y10T 74/133; Y10T 74/138; F02N 15/023; F02N 15/025; F02N 15/06; F02N 15/067
(Continued)

(56) References Cited

U.S. PATENT DOCUMENTS 2,333,765 A * 11/1943 Celio ........................... 290/38 A
2,614,230 A * 10/1952 Schneider ................... 290/38 A
(Continued)

FOREIGN PATENT DOCUMENTS

DE       709 486      8/1941
EP     2 159 410      3/2010
(Continued)

*Primary Examiner* — William Kelleher
*Assistant Examiner* — Zakaria Elahmadi
(74) *Attorney, Agent, or Firm* — Berenato & White, LLC

(57) ABSTRACT

A starter comprises an electric motor which drives a rotor shaft, a drive shaft that can be rotationally coupled to the rotor shaft, and a pinion mounted on the drive shaft and movable in a translational movement between a rest position and an active position by a movement system. The starter comprises a coupling system that couples a rotary movement in one direction of rotation of the rotor shaft to the pinion. The coupling system moves from an uncoupled state into a coupled state and vice versa. In the coupled state, the rotor shaft is firmly attached to the pinion in the starting direction of rotation. In the uncoupled state, the pinion is disconnected from the rotor shaft in both directions of rotation. The starter further comprises a movement system for moving the pinion from the coupling system into the uncoupled state as it moves the pinion into active position.

18 Claims, 8 Drawing Sheets

(51) Int. Cl.

| | | |
|---|---|---|
| *F02N 11/00* | (2006.01) | |
| *H02K 7/108* | (2006.01) | |
| *H02K 7/116* | (2006.01) | |
| *F02N 15/02* | (2006.01) | |
| *F02N 15/04* | (2006.01) | |

(52) U.S. Cl.
CPC ......... *F02N 15/025* (2013.01); *F02N 15/062* (2013.01); *F02N 15/067* (2013.01); *H02K 7/108* (2013.01); *H02K 7/116* (2013.01); *F02N 11/0814* (2013.01); *F02N 15/022* (2013.01); *F02N 15/046* (2013.01)

(58) Field of Classification Search
USPC ........................................ 74/7 A, 7 B, 7 C, 8
See application file for complete search history.

(56) References Cited

U.S. PATENT DOCUMENTS

| | | | | |
|---|---|---|---|---|
| 3,209,603 | A * | 10/1965 | Rodriguez | 74/7 A |
| 3,851,532 | A * | 12/1974 | Pfluger et al. | 74/7 A |
| 4,192,195 | A * | 3/1980 | Kazino | F02N 15/02 464/10 |
| 4,253,557 | A * | 3/1981 | Bunger | 192/54.51 |
| 4,330,713 | A | 5/1982 | Greenwood | |
| 4,883,152 | A * | 11/1989 | Froment | 192/42 |
| 5,167,162 | A * | 12/1992 | Nagashima et al. | 74/7 A |
| 5,998,895 | A * | 12/1999 | Thrasher et al. | 310/83 |
| 6,237,432 | B1 * | 5/2001 | Vilou | 74/7 C |
| 7,018,314 | B2 * | 3/2006 | Hasegawa et al. | 475/5 |
| 7,677,123 | B2 * | 3/2010 | Nawa | F02N 15/046 192/56.61 |
| 8,302,497 | B2 * | 11/2012 | Niimi et al. | 74/7 C |
| 2006/0130600 | A1 * | 6/2006 | Hasegawa | F02N 15/022 74/7 C |
| 2008/0314195 | A1 * | 12/2008 | Andoh | F02N 15/023 74/7 C |
| 2010/0269631 | A1 * | 10/2010 | Niimi et al. | 74/7 E |

FOREIGN PATENT DOCUMENTS

| | | |
|---|---|---|
| FR | 2 873 170 | 1/2006 |
| FR | 2 925 616 | 6/2009 |
| GB | 222 435 | 5/1925 |
| GB | 429 080 | 5/1935 |
| WO | WO 2006/100353 | 9/2006 |

* cited by examiner

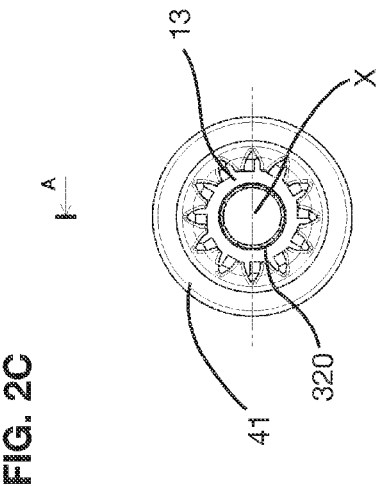
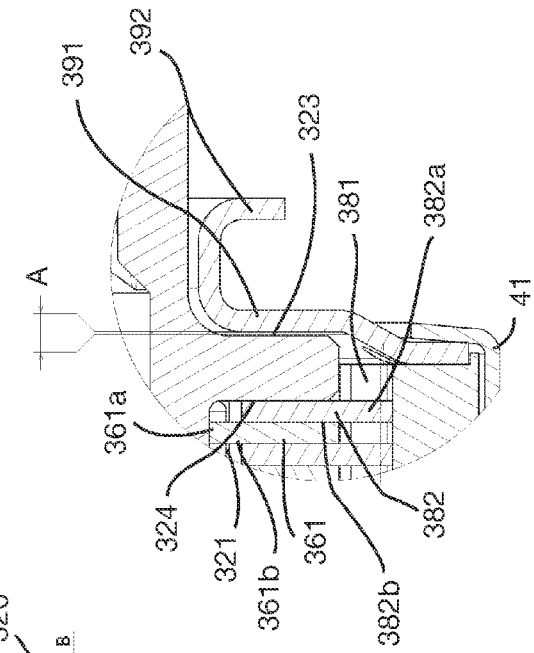
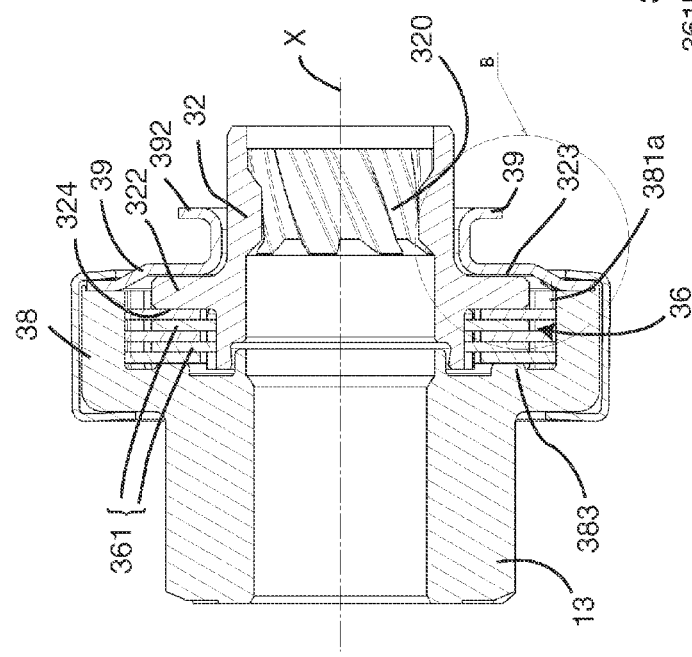

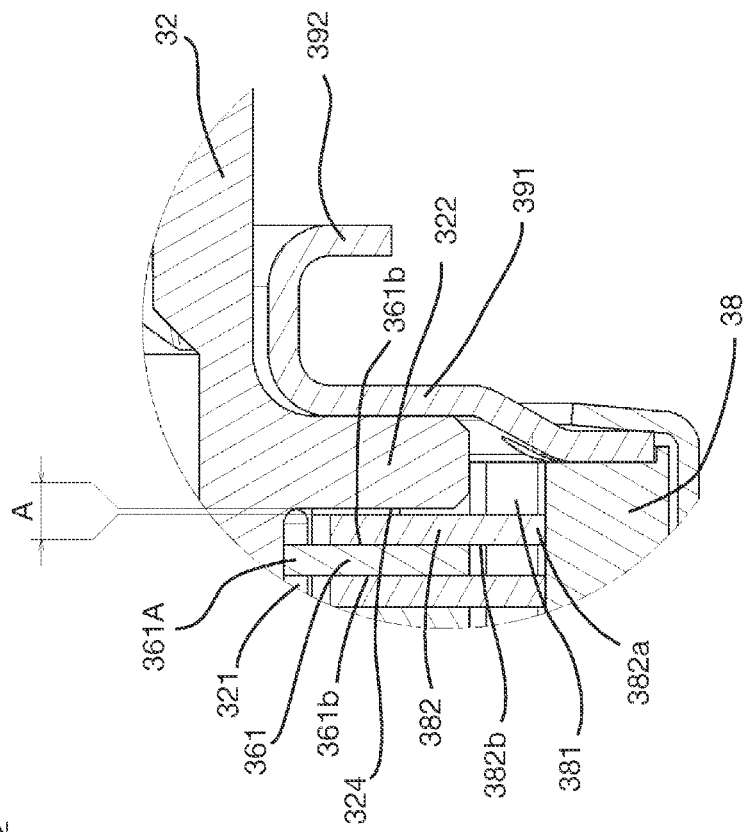
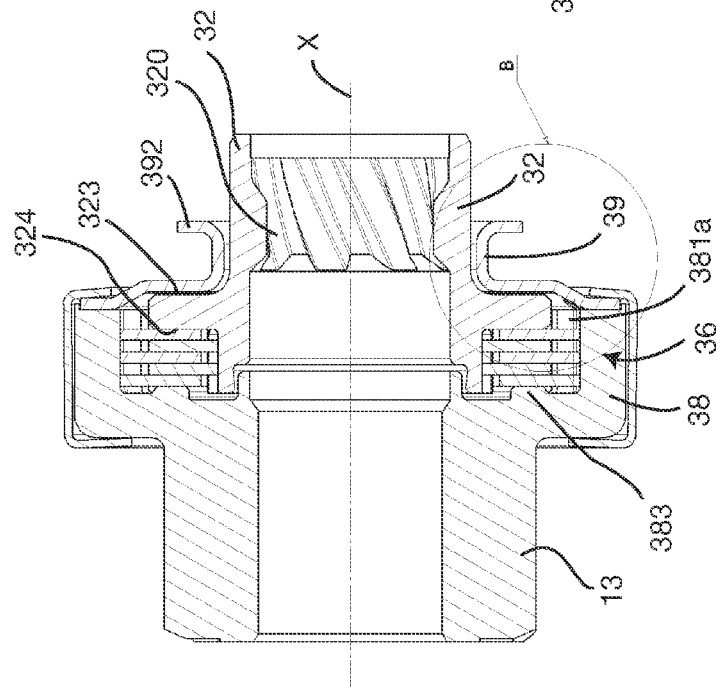

STARTER MOTOR WITH DRIVE ASSEMBLY FITTED WITH A COUPLING SYSTEM FOR COUPLING A PINION MOUNTED FREELY ON ITS ROTOR SHAFT, AND ASSOCIATED METHOD

CROSS-REFERENCE TO RELATED APPLICATIONS AND CLAIM TO PRIORITY

This application is a national stage application of International Application No. PCT/FR2011/051807 filed Jul. 27, 2011, which claims priority to French Patent Application No. 10/56174 filed Jul. 27, 2010, of which the disclosures are incorporated herein by reference and to which priority is claimed.

DOMAIN OF THE INVENTION

The invention concerns a booster starter motor, in particular a thermal motor of a motor vehicle, equipped with a pinion fitted free in rotation in relation to the shaft of the starter motor motor, as well as its system that couples the pinion to the shaft of the starter motor motor.

In order to start up the thermal motor of a vehicle, it is known to use a starter motor capable of transmitting mechanical energy to turn a crankshaft of the motor by the intermediary of toothed wheels. To this effect, the starter motor comprises a pinion installed on a drive shaft driven in rotation by a rotor of an electric motor. This pinion is provided with teeth designed to engage with the teeth of a toothed wheel coupled to the crankshaft of the motor.

The invention is particularly advantageous when applied to vehicles equipped with the thermal motor stop & start function (described hereafter) fitted with booster starter motors. The term booster starter motor signifies the fact that the pinion is mobile in transfer and is likely to pass from a rest position, in which the pinion is released from the toothed wheel coupled to the thermal motor, to an active position in which the pinion is engaged with the toothed wheel, and conversely. In particular, the starter motor is fitted with a booster assembly linked to a mobile contactor by the intermediary of a lever that can send the pinion from the rest position to the active position.

STATE OF THE TECHNIQUE

It is known that a motor vehicle, particularly when it is used in the city, consumes energy even when it has to stop in traffic, given that that its driver motor (thermal) continues running permanently. It was therefore thought to design vehicles with a thermal motor 'stop and start' function which makes it possible to stop the thermal motor when the vehicle is stationary due to traffic conditions. This type of operation requires very frequent starts which give rise to major disadvantages, at the level of the link between the thermal motor and the electric starter motor, explained hereafter in the description.

When the thermal motor is at the stop point, there may be a phase referred to as the 'balancing phase' where the crankshaft may turn in the opposite direction, also referred to hereafter as 'inverted rotation' at the time of the last descent of one or more pistons. This balancing phase causes mechanical problems for the starter motor.

For the starter motor of booster type, during this balancing phase, if the pinion is in the gearing phase, the inverted rotation of the toothed wheel connected to the crankshaft may mill the pinion due to fact that it resists this rotation. This resistance is either due to the fact that the rotor is already driven in the starting direction of rotation, or due to an important resistant torque originating from the force of the joysticks on the manifold of the rotor, the inertia of the rotor and possibly a reducer between the rotor shaft and the pinion. Furthermore, if the pinion is engaged with the toothed wheel and the resistant torque transmitted by the crankshaft exceeds the torque of the electric starter motor, the manifold of the rotor also turns in the opposite direction (inverted rotation), which may destroy or prematurely wear the joysticks that feed the rotor.

One known solution is to avoid this problem by making the booster starter motor engage its pinion in the toothed wheel only when the thermal motor is totally stationary (after the balancing phase). However, this solution has the disadvantage of having to re-start after a delay due to the fact of waiting for the motor to completely stop.

Thus, in order to avoid this disadvantage, the manufacturers preferred to introduce starter motors with permanent gearing. These starter motors may also comprise a free wheel rotating in the opposite direction situated on the rotor shaft, part of which is connected to the body of the starter motor to prevent the rotor from rotating in the opposite direction. A torque limiter may also be installed on the transmission line between the crankshaft and the free wheel rotating in the opposite direction in order to avoid the free wheel rotating in the opposite direction in the balancing phase, preventing the crankshaft from turning in the opposite direction. However these starter motors have several disadvantages.

A first disadvantage is that these starter motors make noise permanently. In effect, the fact is that they are always engaged with the thermal motor and drive a set of mechanical parts to a free wheel of overspeed or torque limiter which may be placed in the starter motor. One solution to avoid this noise problem is to install the free wheel of overspeed upstream of the pinion, that is, the part between the crankshaft and the pinion of the starter motor. However this installation makes the motor flywheel less compact.

A second disadvantage is the wear or oversizing of a certain part in the transmission line between the rotor of the starter motor and the crankshaft due to mechanical constraints at the balancing phase. In effect, all the parts that allow the transmission of rotation between the crankshaft and the free wheel are subject to very significant mechanical stresses due to the fact of the resistant torque particularly applied by the thermal motor on the torque limiter. The term resistant torque signifies friction forces against the rotation. Moreover, this resistant torque may be multiplied by the speed reducer.

Furthermore, in the case of wear of the free wheel during the balancing phase, the rotor may turn in the opposite rotation which may destroy or prematurely wear the joysticks that feed the rotor.

Finally, a third disadvantage is over-consumption. In effect, the fact that the thermal motor drives certain parts of the starter motor in rotation when it is in nominal phase (that is after start-up) in addition to mechanical leaks which give rise to over-consumption for the thermal motor.

There is therefore a need for a booster starter motor which could restart a thermal motor in the balancing phase, without it being likely to incur premature wear, particularly the milling of the pinion and wear of the joysticks due to an inverted rotation.

Object of the Invention

In order to improve the performance of starter motors, the invention proposes a booster starter motor, with thermal motor, particularly of a motor vehicle, comprising an electric motor. The electric motor comprises a rotor, stator and rotor shaft with a longitudinal axis. The rotor drives the rotor shaft in rotation around its longitudinal axis in a direction of rotation of start-up, when the electric motor is on. The starter motor also comprises a drive shaft which may be coupled in rotation with the rotor shaft and which may turn around its longitudinal axis.

The term "which may be coupled" signifies the fact that the drive shaft may be connected in rotation directly or by means of a reducer, or again by means of a coupling system which couples them when it is activated.

The starter motor also comprises a pinion fitted on the drive shaft, which may turn around the longitudinal axis of the drive shaft, the pinion being mobile in transfer in relation to the drive shaft, between a rest position and an active position.

The starter motor also comprises a coupling system of a rotating movement in a direction of rotation from the rotor shaft to the pinion, the coupling system being able to pass from a uncoupled state to a coupled state and vice versa, in which at the coupled state, the rotor shaft is connected in the direction of rotation of start-up to the pinion, and in the uncoupled state, the pinion is disconnected in both directions of rotation of the rotor shaft.

The term 'to connect in rotation', at least in the direction of rotation of start-up, signifies that the electric motor can drive the pinion in rotation for the start-up of the thermal motor.

The starter motor also comprises a displacement system in order to shift the pinion from its rest position to the active position and vice versa, and shift the coupling system to the uncoupled state when it shifts the pinion to the active position.

The term 'active position' signifies the position in which the pinion is in position in order to be engaged with the crown, and the term 'rest position' signifies the position where the starter motor is off.

As stated above, the coupling system may be fitted between the drive shaft and the rotor shaft, but it may also be fitted between the pinion and the drive shaft. In both cases, the pinion is fitted loose in relation to the rotor shaft (that is, free in rotation or disconnected in rotation, in both directions of rotation in relation to the rotor shaft of the electric starter motor) and the coupling system makes it possible to transmit the torque of rotation originating from the electric motor to the pinion when it is active.

To be precise, the starter motor according to the invention has a stator surrounding the rotor. Moreover, the pinion is adapted to drive in rotation a crankshaft of a thermal motor, particularly of a vehicle. Furthermore, in the rest position the pinion is disengaged, and in the active position the pinion may be engaged with a toothed wheel connected in rotation with a crankshaft of a thermal motor. Moreover, the coupling system in the coupled state is able to transmit the necessary torque between the pinion and the rotor shaft to start up the thermal motor by transferring the rotating movement originating from the rotor shaft to the pinion in active position when the electric motor is connected in order to start up the thermal motor.

Thus, the pinion and the connected parts in rotation to the latter are free in rotation in both directions in relation to the rotor shaft when the coupling system is at the uncoupled state, and may be driven in rotation by the motor in operation when the coupling system is at the coupled state.

The coupling system is able to pass from the coupled state to the uncoupled state when the pinion is driven in rotation in the opposite direction to the direction of rotation of the start-up.

Functionally, the term 'free in rotation or disconnected in rotation in both directions in relation to the rotor', signifies the fact that the pinion could perform a multitude of turns in both directions of rotation without transmitting its rotating movement or torque to the rotor.

For example, structurally, the term 'free in rotation or disconnected in rotation in both directions in relation to the rotor', signifies the fact that the pinion unit should be fitted with play on certain parts of the coupling system coupled in rotation in the start-up direction at the rotor shaft. This play thus makes it possible to leave a freedom in rotation and therefore disconnect the pinion of the rotor shaft in rotation.

The term 'pinion assembly, signifies the pinion and connected parts in rotation with the latter in the uncoupled state. This freedom in rotation, in the balancing phase, resolves the problem of wear of the joysticks since the rotor shaft (and hence also the manifold) is no longer driven in rotation in the opposite direction.

In the uncoupled state the pinion, being free in rotation, for example fitted loose on the drive shaft, has practically no torque of resistance to this inverted rotation (just a torque provoked by the friction of the pinion unit on its shaft, and its inertia far below that of the resistant torque of the starter motors of the former art) contrary to the case in which the pinion drives the rotor or even uses the torque limiter.

Thus, at the time of gearing the pinion onto the toothed wheel, the pinion synchronises with the toothed wheel. At the time of synchronisation, the period of contact between a part of the front side of the pinion and a part of the front side of the toothed wheel is not long enough to drive a milling as in the case of the former art. The term synchronisation signifies the fact that the pinion is coordinated at the rotation speed of the toothed wheel, that is, the pinion turns at the speed of the toothed wheel multiplied by the ratio of transmission between the two.

The invention therefore concerns a booster starter motor of a thermal motor, particularly of a motor vehicle, comprising an electric motor with a rotor shaft comprising a longitudinal axis.

The electric motor also comprises a rotor, still known as induced, fitted on the rotor shaft. The electric motor comprises a stator, still known as an inducer, around the rotor. The rotor drives the rotor shaft in rotation around its longitudinal axis in a direction of rotation of start-up, when the electric motor is on.

The starter motor also comprises a drive shaft which may be coupled in rotation with the rotor shaft and may turn around its longitudinal axis.

The starter motor also comprises a pinion fitted on the drive shaft, which may turn around the longitudinal axis of the drive shaft, the pinion being mobile in transfer, following the axis of the drive shaft between a rest position and an active position.

The starter motor also comprises a displacement system in order to shift the pinion from its rest position to the active position and vice versa.

The starter motor also comprises a coupling system of a rotating movement in a direction of rotation from the rotor shaft to the pinion, and the coupling system may pass from an uncoupled state to a coupled state and vice versa, where in the coupled state, the rotor shaft is connected in the direction of rotation of start-up to the pinion, and where in the uncoupled state, the pinion is disconnected in both directions of rotation of the rotor shaft.

According to one mode of completion, the pinion is fitted loose on the drive shaft, the drive shaft is connected in rotation with the rotor shaft, and the coupling system in the uncoupled state, having disconnected the pinion of the drive shaft in rotation in both directions, and at the coupled state having connected the pinion in rotation to the drive shaft in the direction of rotation of start-up by coupling it. This allows only the pinion and the parts connected in rotation in both directions with the pinion to turn in the opposite direction. The drive shaft may therefore be designed to turn in only one direction.

The drive shaft is coupled in rotation to the rotor shaft directly or by means of other elements, for example a reducer.

According to one mode of completion, the coupling system is able to pass from the uncoupled state to the coupled state if the pinion is in active position. This makes it possible to ensure that the coupling system passes to the coupled state when the pinion is engaged with the toothed wheel.

According to one mode of completion, the coupling system is able to pass from the uncoupled state to the coupled state when the pinion is blocked in transfer according to its axis in relation to the rotor shaft, and the electric motor is on.

Thus, the coupling system may use the mechanical or electrical energy originating respectively from the electric motor or the electricity supply that feeds the motor in order to modify its state in order to ensure that the pinion is connected in rotation to the rotor.

According to one mode of completion, the coupling system comprises a mobile driver which can transfer a means to shift the driver from an uncoupled position to a coupled position in relation to the pinion according to the axis of the drive shaft when the electric motor is on, this being a clutch device that makes it possible to couple the drive shaft in rotation to the pinion, where the driver acts on the clutch device so that it couples the drive shaft in rotation to the pinion when the pinion is blocked in transfer according to its axis in relation to the drive shaft and which it transfers to the pinion.

According to one mode of completion, the driver is shifted by means of an electromagnetic device. This mode of completion makes it possible to control the transfer of the driver regardless of whether or not the electric starter motor is on.

According to one mode of completion, the means to shift the driver comprises a part of the drive shaft fitted with spiral grooves, a complementary tapping to the spiral grooves on the driver able to shift it in relation to t h e drive shaft, from an initial position to a final position, according to a spiral movement by cooperating with the grooves. This mode of completion makes it possible to use the energy of the electric motor in order to shift the driver to the pinion in order to engage the clutch device and therefore connect the pinion in rotation to the rotor shaft.

According to one mode of completion, the clutch device is by friction, comprising at least a first friction part connected in rotation with the driver comprising at least one first friction surface, at least one second friction part connected in rotation to the pinion comprising at least one second friction surface with regard to the first friction surface of the first friction part, in which at the state of coupling, the driver is in coupled position and exercises a force on the first friction part against the second friction part so that the drive shaft transmits its movement in rotation to the pinion, and in which at the uncoupled state, the driver is in uncoupled position, allowing the first friction part to have its friction surface or surfaces sliding or spaced in relation to the second friction surface of the second friction part in order to uncouple the torque in rotation from the drive shaft to the pinion.

This mode of completion makes it possible to use mechanical energy, making it possible to transfer the driver to the pinion to engage the clutch device.

According to one mode of completion, the friction clutch device with multiple disks, in which the first friction part is an inner disk connected in rotation with the driver which may transfer in relation to the driver along the axis of the drive shaft, the second friction part is an outer disk situated within a traction flange connected in a direction of rotation with the pinion, the outer disk being connected in rotation with the traction flange and which may transfer along the axis of the drive shaft in relation to the pinion.

In this mode of completion, the fact of having several disks makes it possible to increase the total friction surface in order to increase the torque that may be transmitted for a predetermined compression.

According to one mode of completion, the friction clutch device has a conical clutch, in which the first and second friction surfaces are two complementary tapered surfaces.

According to one mode of completion, the first friction part is fitted on the driver and forms a shoulder on it in such a way that the first friction surface is an outer surface, and the second friction part surrounds the first friction part in such a way that the second friction surface is an internal surface surrounding the first friction part.

This mode of completion has the advantage of reducing the space required by the coupling system.

According to one mode of completion, the displacement system comprises a contactor and a fork, the contactor being able to activate the fork in order to transfer the pinion from the initial position to the active position.

According to one mode of completion, the starter motor comprises a connected part in transfer to the pinion comprising a part forming a booster, which can be in contact with a part of the displacement system in order to be pushed by the latter.

This mode of completion has the advantage of ensuring that the displacement system acts directly on the pinion.

According to one mode of completion, the driver comprises a shoulder situated between the pinion and the booster, in which the displacement system can move the driver by means of the booster part and the shoulder, and where the forward travel of the driver by the displacement device prevents the coupling system from passing from the uncoupled state to the coupled state.

This mode of completion makes it possible to ensure that the displacement system cannot act on the coupling system before the pinion is engaged.

According to one mode of completion, the shoulder situated between the pinion and the booster is the shoulder forming the second friction part.

This mode of completion makes it possible to enhance the compactness of the starter motor.

According to one mode of completion, the displacement system shifts the pinion to the active position by pulling it, and shifts it to the rest position by pushing it.

According to one mode of completion, the displacement system comprises an electromagnetic device and shifts the pinion from the active position to the rest position and vice versa by magnetism and by a means of a return spring.

According to one mode of completion, the part also comprises a second part forming a puller; the puller forms a channel with the booster, into which at least one end of the fork is inserted, and the puller makes it possible to shift the pinion to its initial position.

This mode of completion has the advantage of ensuring constant space between the booster and the puller. This makes it possible to avoid disturbing the course of the fork in order to shift the pinion when worn parts of the starter motor, for example friction surfaces, require a modification of the distance of displacement of the driver between its coupled position and the uncoupled position.

According to one mode of completion, the driver comprises a second shoulder forming puller that forms a channel with the booster into which at least one end of the fork is inserted, the puller allowing the displacement system to shift the pinion to its initial position.

This mode of completion has the advantage of ensuring that the coupling system passes from the coupled state to the uncoupled state at the time of the disengagement of the pinion of the toothed wheel.

According to one mode of completion, the displacement system, in order to shift the pinion from its rest position to the active position and vice versa, shifts the pinion by means of at least one part connected in rotation with the pinion.

According to one mode of completion, the displacement system, in order to shift the pinion from its rest position to the active position and vice versa, shifts by acting directly on the pinion.

According to one mode of completion, the displacement system first of all shifts the pinion to the active position without shifting the starter motor, and secondly shifts the entire coupling system.

According to one mode of completion, the displacement system pushes onto a part fixed to the traction flange.

The invention also concerns a motor vehicle comprising a starter motor as previously described.

The invention also concerns an operating procedure of a booster starter motor when starting a thermal motor of a vehicle in balancing phase; the procedure comprising the following:

a stage A consisting of moving forward a pinion of the starter motor, the pinion being free in rotation in both directions in relation to a drive shaft, until it comes into contact with a toothed wheel linked mechanically to a crankshaft of the thermal motor, a stage B, after stage A, consisting of synchronising the rotation speed of the pinion with the rotation speed of the toothed wheel when the pinion is in tooth-to-tooth position with the toothed wheel, a stage C, after stage B, consisting of engaging the pinion in the toothed wheel when the pinion is synchronised with the toothed wheel, a stage D consisting of turning on an electric starter motor, even if stages B and C are not completed, a sub-stage D 1, after stage D, consisting of activating a coupling system by coupling the pinion in rotation to the drive shaft mechanically linked to the rotor if the pinion is blocked in transfer, and a stage E, after stages D 1 and C, consisting of driving the pinion in rotation in the start-up direction by means of the rotor.

This procedure makes it possible to ensure that the pinion does not drive the electric starter motor in the opposite direction at the time of a balancing phase.

According to one mode of completion, the starter motor is the starter motor according to the invention previously described.

According to one mode of completion, during the stage of synchronisation, the pinion turns in the direction opposite to the start-up direction.

The invention will be better understood upon reading the following description and examining the accompanying figures.

BRIEF DESCRIPTION OF DRAWINGS

These figures are only given by way of illustration but they do not in any way limit the invention in which:

FIGS. 2*a*, 2*b* and 2*c* respectively show a section view, a partial section view and a side view of a first example of a coupling system comprising a multidisk clutch device in coupled position of the booster starter motor shown in FIG. 1;

FIGS. 2*d*, 2*e* show, respectively, a section view and a partial section view of the first example of the coupling system in the uncoupled state of the booster starter motor shown in FIG. 1;

DESCRIPTION OF EXAMPLES OF COMPLETION OF THE INVENTION

The identical, similar or analogous elements of an example of a mode of completion retain the same references from one figure to the other.

Figure 1:
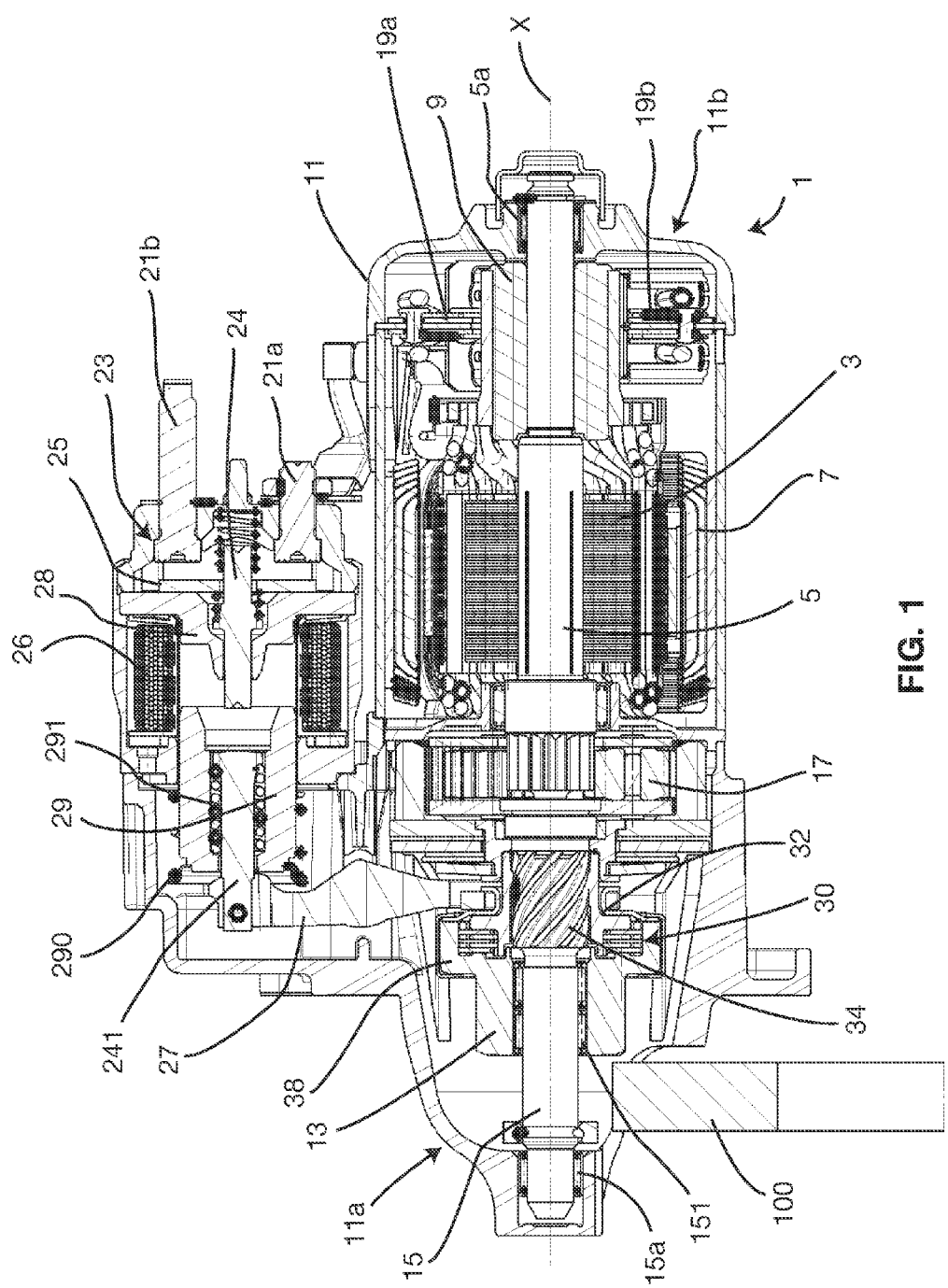
FIG. 1 shows a section view of a booster starter motor in rest position according to the invention.
Figure 3:
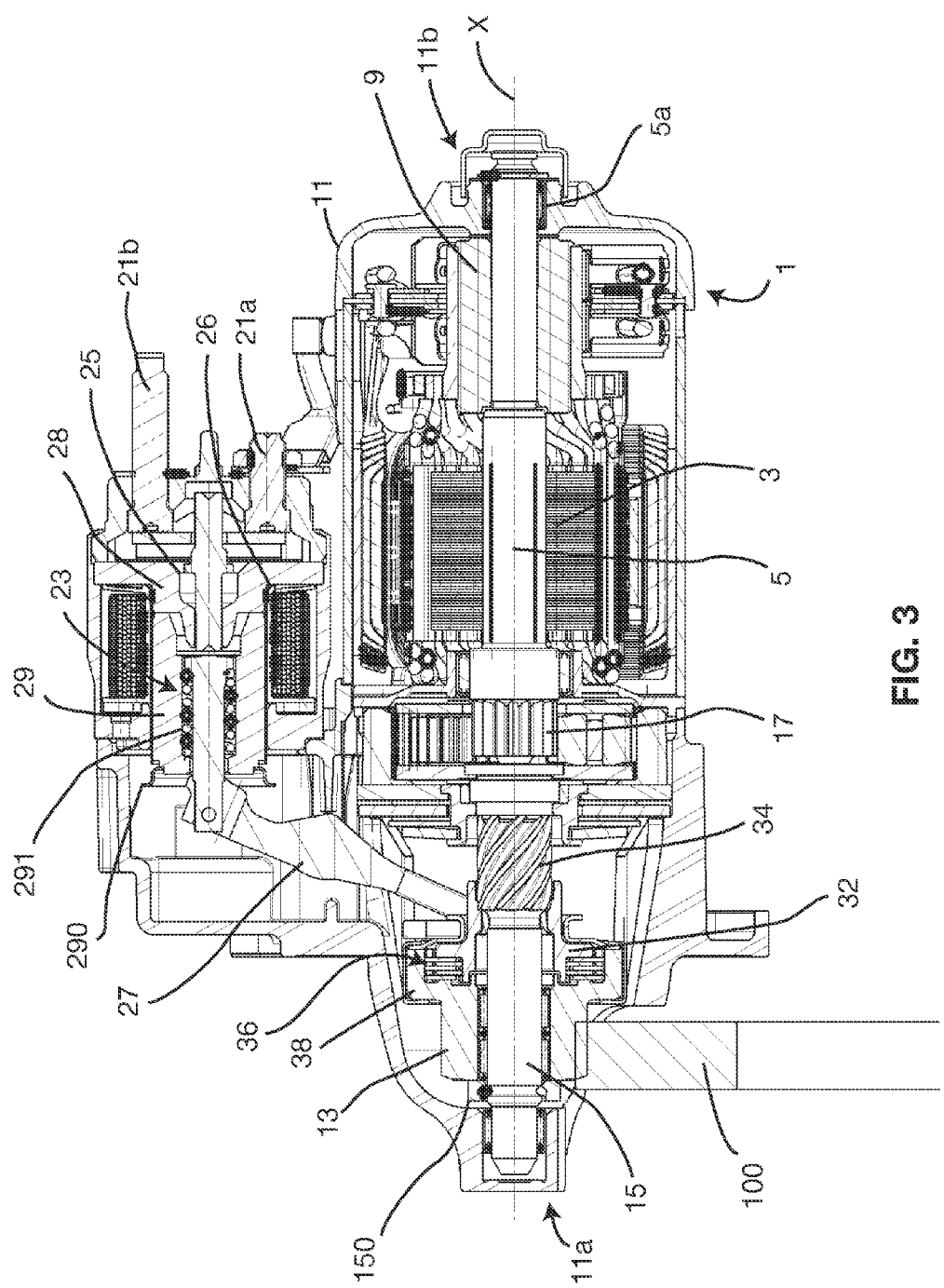
FIGS. 3 and 4 show section views of the booster starter motor shown on FIG. 1, but in the active position and the tooth-to-tooth position respectively.
Figure 4:
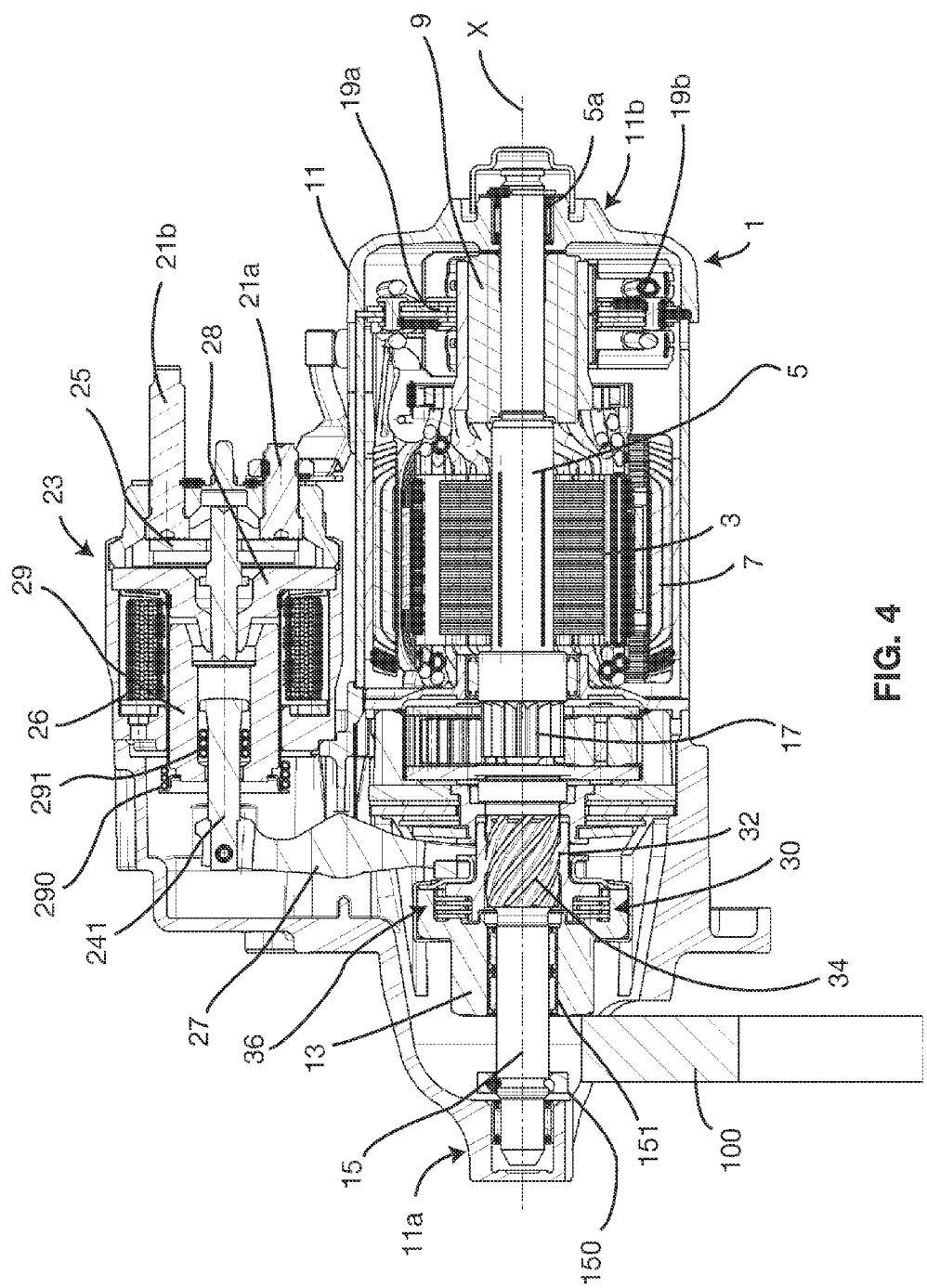

FIGS. 1, 3 and 4 show an example of a starter motor 1 according to a first mode of completion of the invention in different positions. Starter 1 is of "booster" Type. Starter 1 comprises an electric motor comprising on the one hand a rotor part 3, still known as induced, fitted on a rotor shaft 5 which may turn around its longitudinal X axis, and on the other hand a stator 7, still known as inducer, around rotor 3. Rotor shaft 5 has its rear end fitted in a roller 5*a* of a bearing 11*b* behind starter motor 1 (referred to as rear bearing). The terms rear and front are defined in the description below.

A manifold 9 is fitted behind rotor 3 on rotor shaft 5, comprising contact parts electrically connected to rotor 5.

Stator 7 is carried by a body 11. Stator 7 may comprise several permanent magnets. As a variant, these magnets are replaced by electromagnets.

Starter 1 also comprises a pinion 13 fitted loose on a drive shaft 15. The pinion is able to transfer onto the drive shaft according to the longitudinal X axis between an active position and a rest position. Drive shaft 15 has one of its ends fitted onto bearing 11*a* (referred to as the front bearing) comprising one or more needle roller bearings 15*a* on the front part of starter motor 1. In this case, pinion 13 is fitted onto two needle roller bearings. Furthermore, pinion 13 is fitted in such a way as to transfer according to the X axis in relation to drive according to shaft 15 from a rest position to an active position. In active position, pinion 13 is intended to drive a toothed wheel 100 in rotation, driving a crankshaft of a thermal motor in rotation (not shown). In this case, the X axis of drive shaft 15 is significantly the same as the X axis of rotor shaft 5, but could be different as in the examples described below.

Thus, later in the description, the front and rear are according to the longitudinal direction of the X axis of drive shaft 15 or rotor shaft 5, in such a way that a front side of a part is the side that faces bearing 11*a* and the rear side is the side that faces rear roller bearing 5*a*.

Starter 1 also comprises a displacement system of pinion 13 from its rest position to its active position and vice-versa. This displacement system comprises a contactor 23 and a lever in the shape of a fork, described hereafter in the description.

Starter motor 1 also comprises a reducer system 17 fitted between rotor shaft 5 and drive shaft 15, of which a dynamic end is linked to rotor shaft 5 and the other end is linked to drive shaft 15. The reducer system 17 in this case is an epicycloid gear but may be any other type of reducer.

For example, reducer system 17 could comprise two toothed wheels, one of which is connected to rotor shaft 5 and the other to drive shaft 15. In this example, both axes of rotor shaft 5 and drive shaft 15 care laid out parallel to each other. According to another example, reducer system 17 may have left gears or concurrent gears. In these two type of reducer system 17, the axis of drive shaft 15 and the axis of rotor shaft 5 are concurrent, or neither parallel nor concurrent, respectively.

A set of joysticks 19*a* and 19*b* is provided for the electricity supply of the coiling of rotor 3. At least one of the joysticks 19*b* is electrically linked to the mass of starter motor 1, for example body 11, and at least one other of the joysticks 19*a* is electrically linked to an electric terminal 21*a* of contactor 23, for example via a wire. Joysticks 19*a* and 19*b* rub against manifold 9 when rotor 3 is in rotation. Starter 1 may comprise several joysticks.

Contactor 23 of starter motor 1 also comprises terminal 21*a* linked to joystick 19*a*, a terminal 21*b* intended to be linked via an electrical linking element to a positive electricity supply V+ of the vehicle, particularly a battery, not shown. A normally open contact (not shown) situated between a terminal V+ of the electricity supply and terminal 21*b*, controls the supply of contactor 23 to turn on the electric motor.

Contactor 23 comprises a mobile contact plate 25 to electrically link terminals 21*b* and 21*a* in order to turn on the electric motor. The contactor 23 is also able to activate a fork 27 in order to shift pinion 13 according to the X axis of drive shaft 15 in relation to drive shaft 15, from the rest position to the active position and vice versa. Contactor 23 also comprises a mobile core 29, a fixed core 28, a fixed coil 26, a control rod 24 mobile and a mobile rod 241.

Control rod 24 passes through fixed core 28 which it uses as a guide. This control rod 24 has its front end supported by mobile core 29 and its rear end fixed to contact plate 25. Control rod 24 is subject to the action of a compressed contact spring (not referenced) between a shoulder of control rod 24 and contact plate 25 in order to ensure the electrical contact of the contact plate with terminals 21*a* and 21*b* when mobile core 29 is in a so-called magnetic position.

Mobile rod 241 is fixed at its front end to fork 27. When the coil is live, mobile core 29 is attracted to fixed core 28 until it is in magnetic position. Its displacement simultaneously drives back mobile rod 241, contact plate 25 and control rod 24. Mobile rod 241 is also subject to a tooth-to-tooth spring 291 housed inside mobile core 29 and surrounding mobile rod 241. This tooth-to-tooth spring 291 is supported by a front shoulder of mobile rod 241 and a rear shoulder of mobile core 29. This tooth-to-tooth spring 291 is compressed when the contact plate 25 is displaced towards terminals 21*b*, 21*a* and when fork 27 can no longer move pinion 13. Fork 27 may no longer move when pinion 13 is blocked in transfer according to the X axis in the direction of toothed wheel 100 by one or more teeth of toothed wheel 100. This blocked state is referred to hereafter as 'tooth-to-tooth position', shown on FIG. 4. This position is described hereafter in the description. The compression of the tooth-to-tooth spring 291 makes it possible to apply a force on fork 27 transmitted to pinion 13 towards the active position.

Contactor 23 also comprises a return spring 290, supported by fixed coil 26 and mobile core 29 in order to urge it forward until it reaches its rest position and simultaneously shifts fork 27 until pinion 13 is in the rest position.

Starter 1 also comprises a coupling system 30 set out between pinion 13 and reducer system 17. This coupling system 30 may pass from an uncoupled state to a coupled state and vice versa. At t h e coupled state, rotor shaft 5 is connected to pinion 13 in the direction of start-up rotation. At the uncoupled state, pinion 13 is disconnected from rotor shaft 5 in both directions of rotation. In this case, this coupling system makes it possible to couple pinion 13 to drive shaft 15. FIG. 2*a* shows a torque of this coupling system 30 and pinion 13 without drive shaft 15.

Coupling system 30 comprises a driver 32 and a traction flange 38.

Traction flange 38 is at least connected in rotation in the direction of start-up rotation with pinion 13. In this case, traction flange 38 is integral with pinion 13 and is therefore connected in rotation and in transfer.

In the examples, the term 'connected in transfer' signifies two parts connected in such a way that if one is made to transfer between two positions, the second part is shifted simultaneously with the first.

Another example, not shown, would consist of pinion 13 being fitted on a rear part of traction flange 38 by means of a key and groove that allows pinion 13 to be connected only in rotation.

In this case, traction flange 38 forms a shoulder in relation to pinion 13. This flask 38 axially surrounds one part of driver 32. The term surround signifies the fact that driver 32 is partially inserted into a hollow of traction flange 38.

In this case, traction flange 38 and driver 32 may each turn on itself around the X axis of drive shaft 15.

The driver 32 comprises an opening crossing from a front side to a rear side, whereby drive shaft 15 is inserted. The opening is cylindrical apart from one part where the driver 32 comprises grooves on its inner periphery forming a tapping spiral 320, shown on FIG. 2*a*.

This tapping spiral 320 is complementary with a thread spiral 34 consisting of grooves situated on part of the drive shaft 15. The tapping spiral 320 and thread spiral 34 are part of the coupling system 30. The thread spiral 34 is shown on FIGS. 1, 3 and 4. The tapping spiral 320 and thread spiral 34 allow the driver 32 to be driven in transfer (i.e., axially)

along the X axis and rotationally relative to drive shaft 15. Thus, the driver 32 is axially moveable from an initial position (see FIG. 1) to a final position (see FIG. 3) relative to drive shaft 15.

In particular, the thread spiral 34 and the tapping spiral 320 are adapted to shift the driver 32 toward the pinion 13 from an uncoupled position (see FIG. 1) to a coupled position (see FIG. 3) relative to pinion 13. For example, the driver 32 may be shifted along the X axis relative to the pinion 13 towards the latter, when the latter is in the uncoupled position, the motor drives the rotor 3 in rotation and the pinion 13 is axially immobile. The displacement of the driver 32 toward the pinion 13 makes it possible to activate a clutch device 36 to non-rotatably couple the drive shaft 15 to the pinion 13.

Driver 32 also comprises a shoulder 322 on its outer periphery. Driver 32, in this case, is a shaft, the outer periphery of which is channeled and comprises shoulders. The X axis of driver 32 is identical to that of drive shaft 15 when the latter are assembled together.

This shoulder 322 comprises at least two radial sides, a support side 323 to transfer driver 32 forward according to the X axis when fork 27 passes from the deactivated position to the active position in relation to body 11 and a pressure side 324 which is part of clutch device 36.

The coupling system therefore comprises a clutch device 36 that makes it possible to connect traction flange 38 and driver 32 in rotation in order to connect pinion 13 to rotor 3. The coupling system 30 shown is a friction clutch device 36, in particular a disk.

This disk clutch device 36 comprises at least one disk 361, 382. Disk 361, 382 may transfer according to the X axis in relation to a first part and is connected in rotation with the latter.

The first part may be driver 32 or traction flange 38. For example, disk 361, 382 comprises sprockets 361*a* and the first part comprises notches corresponding to sprockets 361*a* of disk 361, 382 in order to allow disk 361, 382 to transfer according to the X axis in relation to the first part 32, 38 and to be connected in rotation with the latter. Disk 361, 382 comprises a friction surface, also referred to as friction surface 361*b*, 382*b* which can be put in contact with a friction surface connected in rotation with a second part. The second part is driver 32 or traction flange 38. Friction surface 361*b* of disk 361, 382 and the friction surface connected in rotation with the second part 32, 38 comprise characteristics such that they make it possible to transfer a predetermined torque for a predetermined axial compression between the surface of the disk and the friction surface. The predetermined torque is such that starter motor 1 could start up the thermal motor and the predetermined compression corresponds to the force of pressure of driver 32 on pinion 13 when driver 32 is in coupled position. Clutch device 36, shown on the figures, is described in greater detail in the description below.

In this case, disk clutch device 36 is multidisk 36. This clutch device 36 comprises on the one hand inner disks 361 and on the other hand outer disks 382, fitted onto the outer periphery of driver 32 and in the hollow of traction flange 38 respectively. In this case, there are two inner disks 361 and three outer disks 382.

The inner disks 361 comprise an opening that crosses between its two larger sides, the inner periphery of which corresponds significantly to the outer periphery of driver 32 surrounded by traction flange 38. The inner disks 361 are arranged so as to be connected in rotation with driver 32 and to transfer onto the surface or surfaces forming the outer periphery of driver 32 surrounded by traction flange 38.

Outer disks 382 comprise an outer periphery corresponding significantly to the inner periphery of the hollow of traction flange 38. The outer disks 382 are arranged in order to be connected in rotation with traction flange 38 and to transfer onto the inner periphery surface or surfaces of traction flange 38 surrounding part of driver 32.

The disks are in a friction material such a s bronze and steel, making it possible to transmit a torque by friction (the predetermined torque) between traction flange 38 and driver 32, when the latter moves forward in coupled position (predetermined compression), sufficient to start up the thermal motor when they operate in synch.

In this case, clutch device 36 comprises at least one notch 321 situated in the outer periphery of driver 32 surrounded by traction flange 38. Notch 321 extends according to the X axis of driver 32. This notch 321 is at a depth which extends radially in the driver 32 towards the X axis.

In this case, this notch 321 ends on a front side of driver 32 in order to insert sprockets 361*a* in inner disk 361. The length according to the X axis of notch 321 is such that shoulder 322 is situated at the longitudinal end of notch 321 opposite the end of notch 321 that ends on the front side.

In this case, driver 32 comprises several notches 321, preferably regularly divided around the outer periphery of driver 32 in order to spread the mechanical constraints on driver 32. There may be between one and approximately three hundred and sixty notches of preferences spread at angles around the outer periphery of driver 32 surrounded by traction flange 38. In this case, there are only twenty-two shown on FIGS. 1 to 4. A lateral wall of a notch 321 is shown on FIG. 2*b*, showing a partial enlargement of FIG. 2*a*.

In this case, each inner disk 361 comprises as many inner sprockets 361*a* as notches 321. These sprockets 361*a* are complementary to notches 321 of driver 32. Sprockets 361*a* and notches 321 allow the inner disks to transfer according to the X axis and to be connected in rotation with the latter.

Sprockets 361*a* of an inner disk 361 are situated on the inner periphery of opening of inner disk 361 in such a way as to cooperate with notches 321 of driver 32.

These inner disks 361 cooperate with outer disks 382 fitted in the inner periphery of traction flange 38.

The outer disks 382 are fitted into traction flange 38 by means of at least one sprocket 382*a,* and at least one corresponding notch 381.

In this case, clutch device 36 comprises at least one notch 381 situated in the inner periphery of traction flange 38. This notch 381 is, for example, a groove, the depth of which extends radially into traction flange 38 and the length of which extends according to the X axis.

Notch 381 ends on a rear side of traction flange 38 in order to make it possible to insert a sprocket 382*a* of each outer disk 382 into notch 381. The length of notch 381 according to the X axis of traction flange 38 is at least equal to the length according to the X axis between a disk stop 383 and the rear side of traction flange 38. This disk stop 383 is situated in the hollow of traction flange 38. In this case, the disk stop 383 is situated on one side in the hollow of traction flange 38, perpendicular to the X axis of traction flange 38.

Each outer disk 382 therefore comprises at least one sprocket 382*a* corresponding to notch 381. This sprocket 382*a* is on the periphery of the outer disk 382 and extends radially. There are as many sprockets 382*a* on an outer disk 382 as notches 381 on traction flange 38. In this case, there are twenty notches 381 and twenty sprockets 382*a* per outer disk 382.

Each outer disk 382 is fitted into traction flange 38 by having their sprockets 382a inserted into notches 381 of traction flange 38.

Inner disks 361 are therefore connected in rotation with driver 32 and outer disks 382 are connected in rotation with traction flange 38. Disks 361 and 382 may slide according to the X axis by means of notches 321, 381 and their corresponding sprockets 361a, 382a.

Coupling system 30 also comprises a ring 39 that closes the rear of traction flange 38. In this case, ring 39 comprises two plates 391, 392 surrounding driver 32. In this case, the plates are in the shape of a disk. Plates 391, 392 form an outer radial channel between them. The first plate 391 closes the rear of traction flange 38 and the second 392 is parallel to the first. The first plate 391 is referred to as pusher 391 and the second plate 392 is referred to as puller 392. The channel is intended to house two ends of fork 27.

The rear part of driver 32 is inserted into ring 39. Driver 32 and ring 39 are fitted with play.

Furthermore, ring 39 is fixed on the rear part of traction flange 38. In this case, ring 39 is fixed by pressure against the rear side of traction flange 38. To be precise, one end of the first ring 39 is compressed between the rear side of traction flange 38 and an elastically deformed plate of a holding part 41 which matches the shape of the outer periphery of traction flange 38. Other procedures may be implemented to fix ring 39, such a s welding, screwing or even clipping (elastic deformation).

Pusher 391 is therefore coupled at least in transfer with pinion 13; in this case they are also coupled in rotation.

Pusher 391 is adapted to prevent fork 27 from being in direct contact with driver 32 when the latter is activated. Thus, fork 27 does not push driver 32 directly.

Furthermore, pusher 391 is able to allow a fork 27 to transfer pinion 13 from the rest position to the active position. The term 'active position' signifies in position engaged with the toothed wheel.

Thus, the arrangement of pinion 13, pusher 391, driver 32 and the displacement system are arranged so that the displacement system of the piston does not activate the clutch device 36 when the displacement system shifts pinion 13 from the rest position to the active position.

Pusher 391 is positioned between shoulder 322 of driver 32 and rotor 3. Driver 32 therefore has its shoulder 322 between pusher 391 and one of the disks 382 of clutch device 36.

Pusher 391 is intended to push pinion 13 forwards in transfer according to the X axis when fork 27 passes from the deactivated position to the active position. Furthermore, pusher 391 is also intended to push driver 32 forwards by pushing shoulder 322 without engaging clutch device 36.

Puller 392 is intended to pull on pinion 13 backwards when fork 27 passes from the active position to the deactivated position.

Ring 39 has the advantage of having a channel of constant length for fork 27 between the pusher and puller 392 even if disks 361, 382 are worn. This constant play makes it possible to ensure that fork 27 does not prevent driver 32 from moving in relation to pinion 13, and therefore coupling with the latter. Moreover, this first example has the advantage of ensuring that pinion 13, in rest position, does not move in transfer when starter motor 1 is at the passive state (not supplied).

The dimensions and arrangement of disks 361, 382, of traction flange 38, driver 32 and pusher 391, are such that when they are assembled, driver 32 may be displaced in transfer according to the X axis in relation to traction flange 38 (therefore also in relation to pinion 13) between two positions, a coupled position shown on FIGS. 2a and 2b, and an uncoupled position shown on FIGS. 2d and 2e.

The axial distance between the disk stop 383 and the front side of pusher 391 exceeds the thickness of disks 361, 382 and shoulder 322. This difference corresponds to play A, shown on FIGS. 2b and 2e. This play A shows the run between driver 32 in relation to traction flange 38 between its two positions.

On FIG. 2b, in coupled position, outer disks 382 and inner disks 361 are attached and sandwiched (jammed on both sides) by disk stop 383 and shoulder 322. Play A is therefore situated between pusher 391 and shoulder 322. In this position, disks 361, 382 are compressed together between disk stop 383 and shoulder 322. This compression couples pinion 13 to drive shaft 15. In particular, the compression of disks 361, 382 increases the coefficient of adherence between these disks 361, 382 in order to connect driver 32 to traction flange 38 in rotation up to a predetermined torque. Beyond this torque, disks 361, 382 slide. This predetermined torque corresponds at least to the torque necessary to start the thermal motor originating from the electric motor of starter motor 1.

On FIG. 2e, play A is shown in such a way that it is situated between the last disk 382 and shoulder 322. However, it may be divided into several sets transmitted between the disk stop 383, disks 361, 382 and the pressure side 324. In uncoupled position, as shown on FIG. 2e, outer disks 382 and inner disks 361 are attached without being compressed, and play A is situated between the last disk and shoulder 322. Shoulder 322 is therefore attached to pusher 391.

Play A may be adjusted, particularly in order to enlarge it, by machining the disk stop 383 of traction flange 38 and/or shoulder 322 of driver 32, or even by putting back pushbutton 391, and to decrease play A by adding a washer between shoulder 322 and pushbutton 391.

Now, the operating principle of this starter motor 1 will be described, set out in such a way as to start up a thermal motor of a vehicle. Only one part of a toothed wheel 100 mechanically linked to the crankshaft of the thermal motor is shown on FIGS. 1, 3 and 4.

On FIG. 1, starter motor 1 is at the rest state, in other words contactor 23 is not active (on). In this state, the end of fork 27 linked to mobile rod 241 is forced forwards by return spring 290. Fork 27 is in the so-called deactivated position. In this position, fork 27 forces pinion 13 into the rest position by blocking it by means of puller 392.

When fixed coil 26 is excited, that is, when the contactor is turned on by its terminal 21b, mobile core 29 is attracted to fixed core 28 in order to simultaneously provoke the displacement of the mobile contact, via control rod 24, in the direction of terminals 21b and 21a and the balancing of fork 27 from a deactivated position to an active position. This displacement of fork 27 simultaneously shifts pinion 13 forwards by pushing pusher 391 as mentioned above. We now go on to explain the possible phases throughout the forward travel of pinion 13.

At first, at the time of the forward travel of pinion 13, the outer disks 382 slide into notches 381 of traction flange 38 until driver 32 stops with booster 39. In this configuration, play A is transmitted between front disk 382 (also referred to as first disk) and stop 393. During this entire configuration due to the fact of play A situated or dispersed between shoulder 322 and disk stop 383, disks 361, 382 are not sufficiently compressed against each other to transmit a torque but are only in contact in order to slide between them in case of rotation of traction flange 38 in relation to driver 32. Pinion 13 is therefore uncoupled in rotation of driver 32, in other words free in rotation in both directions in relation to the latter. However, it is also possible for play A to remain dispersed between disks 361, 382 in such a way that their friction surfaces are not in contact throughout this phase of forward travel.

Secondly, pinion 13 and outer disks 382 transfer forwards in relation to drive shaft 15. The inner disks 361 and driver 32 are pushed forward by pusher 391 by shifting according to a spiral movement on drive shaft 15.

Thirdly, pinion 13 may find itself in tooth-to-tooth position, as shown on FIG. 4. In this position there are two possibilities: a first case is when the gearing of pinion 13 on the toothed wheel 100 takes place when the thermal motor is stationary, and the second case is when the thermal motor is in balancing phase.

In both cases, pinion 13 leans on toothed wheel 100, preventing mobile rod 241 from being shifted backwards by means of fork 27. The tooth-to-tooth spring 291 makes it possible for mobile core 29 to continue to shift in the direction of fixed core 28 and simultaneously push control rod 24 backwards from the starter motor, by compressing itself.

Mobile core 29 and control rod 24 shift until contact plate 25 is in contact with both terminals 21b and 21a. This contact turns on the electric motor of starter motor 1, that is, causes rotor 3, rotor shaft 5, reducer system 17, drive shaft 15 and driver 32 to rotate simultaneously.

However, due to the fact of the inertia of driver 32, a resistant torque is created between thread 34 and tapping 320. This resistant torque provokes the forward travel of driver 32 in relation to drive shaft 15. In this case, driver 32 moves forward in relation to pinion 13. By shifting, it pushes disk 361, 382 forwards in relation to pinion 13.

In the first case, disks 361, 382 move forward until the former is in contact with disk stop 383. Set A is therefore transmitted between pusher 391 and shoulder 322 of driver 32. In this configuration, the resistant torque compresses disks 361, 382 together sufficiently to prevent the disks from sliding and to transmit the mechanical energy from the electric motor to pinion 13. Pinion 13 turns in rotation, to bring forward its teeth in relation to that of toothed wheel 100. The shift and forward thrust of fork 27 onto pinion 13 by means of pusher 391 engage pinion 13 with toothed wheel 100.

In the second case, during the compression of the tooth-to-tooth spring 291, toothed wheel 100 turns in inverse rotation and drives pinion 13 by having one part of its front side in contact with one part of the front side of toothed wheel 100.

Thus, in tooth-to-tooth position and in balancing phase, the fact that toothed wheel 100 drives pinion 13 by contact may make it possible to synchronise the rotation speed (rotation in the opposite direction in relation to that of start-up) of pinion 13 in relation to that of toothed wheel 100.

The fact of being disconnected from drive shaft 15 thus allows rapid synchronisation and therefore a sufficiently short contact period to avoid giving rise to a milling. The fact of being disconnected in rotation in both directions also makes it possible to prevent pinion 13 from driving rotor shaft 5 in rotation in the opposite direction.

When pinion 13 is synchronised with toothed wheel 100, the fact that fork 27 always exercises forward pressure on pinion 13 (by means of tooth-to-tooth spring 291 which is compressed) gives rise to the gearing of pinion 13 in toothed wheel 100 by gradually entering the teeth of pinion 13 between those of toothed wheel 100.

During gearing, even if the engine is on, driver 32 does not move forward in relation to pinion 13 in so far as the latter has not reached the active position, that is it is at a stop against a stop of pinion 150 on drive shaft 15.

Throughout the forward travel of the teeth of pinion 13 between the teeth of toothed wheel 100, clutch device 36 is at the declutched state. Pinion 13 is therefore disconnected from driver 32. This makes it possible to avoid any milling whatsoever between the teeth of pinion 13 and the teeth of toothed wheel 100. Fork 27 therefore continues to move the teeth of pinion 13 between those of toothed wheel 100 until pinion 13 is in contact with the stop of pinion 150, that is, in active position.

On FIG. 3, pinion 13 is shown in active position.

In active position, driver 32 moves forward in relation to pinion 13 due to the rotation of rotor shaft 5 of the electric motor in operation, and pinion 13 blocked in transfer by stop of pinion 150 until it reaches the coupled position. The forward travel of driver 32 in relation to pinion 13 makes it possible to activate clutch device 36, in this case by compressing disks 361, 382 in friction with each other.

Starter motor 1 is then in engaged position. The compression of disks 361, 382 makes it possible to transmit the torque of the electric motor from starter motor 1 to pinion 13. This torque stops the inverted rotation of pinion 13 which turns in the start-up direction. Starter motor 1 is then in start-up phase, that is, it drives toothed wheel 100 in rotation in the start-up direction. The time of the balancing phase is therefore reduced and the thermal motor restarts without provoking the premature wear of parts in the transmission line of the rotating movement between the crankshaft and the electric starter motor.

To sum up, at the time of start-up, pinion 13 is coupled with driver 32 and drive shaft 15 only when pinion 13 is blocked in forward transfer, in this case in engaged position, and rotor 3 turns in the start-up direction.

When the thermal motor is started up, pinion 13, linked in rotation to the crankshaft, turns faster than drive shaft 15 in rotation by rotor 3. The rotation speed of pinion 13 exceeds the speed of drive shaft 15 and provokes the declutching of clutch device 36 by moving driver 32 backwards.

Driver 32 goes back until its speed in rotation around the X axis is equivalent to that of drive shaft 15. This speed difference is particularly due to the angle of the grooves of tapping 320 and thread 34.

In effect, in engaged position, at the time of phase of overspeed in rotation of toothed wheel 100 in relation to drive shaft 15, pinion 13 is driven by the thermal motor and no longer by the electric motor. Thus, upon the departure of the overspeed phase, pinion 13 drives driver 32 in rotation, which by the effect of unscrewing moves backwards in relation to drive shaft 15 and pinion 13. Drive shaft 15 is therefore always driven in rotation by the electric motor. Driver 32 moves backwards in relation to pinion 13 until it reaches the rotation speed of drive shaft 15. The friction clutch is then at the declutched state. Driver 32 is therefore uncoupled in relation to pinion 13.

Thus, the gear device finds a position of equilibrium, that is when the inner disks 361 slide in relation to outer disks 382, provoking a torque equivalent to the torque by making driver 32 move forward on drive shaft 15.

Drive shaft 15 is therefore no longer coupled in rotation with pinion 13 when it is driven at a higher rotation speed than that of drive shaft 15.

Thus, this mode of completion of starter motor 1 makes it possible to prevent its rotor 3 from being driven in overspeed or driven in inverse rotation. Furthermore, this starter motor 1 may have no free wheel, since coupling system 30 also acts as a free wheel.

The withdrawal phase of pinion 13 is described below, that is, the phase of displacement of pinion 13 from the active position to the rest position.

When the electric motor and contactor 23 of starter motor 1 are no longer ignited, the coil of contactor 23 is therefore no longer excited and rotor 3 is no longer driven in rotation. The mobile core 29 is then n o longer attracted to fixed core 28, return spring 290 then pushes mobile core 29 to the front of starter motor 1, which simultaneously shifts fork 27 from its active position to its deactivated position by simultaneously pulling control rod 24 and contact plate 25.

Fork 27 therefore simultaneously moves pinion 13 to its rest position by means of puller 392. At the beginning of this withdrawal phase, pinion 13 is released from toothed wheel 100 and is then shifted until it reaches its rest position. During this withdrawal phase, pinion 13 pushes driver 32 backwards by means of its disk stop 383, disks 382, 361 and shoulder 322

According to another example of the first mode of completion, ring 39 and holding part 41 are integral.

Figure 5:
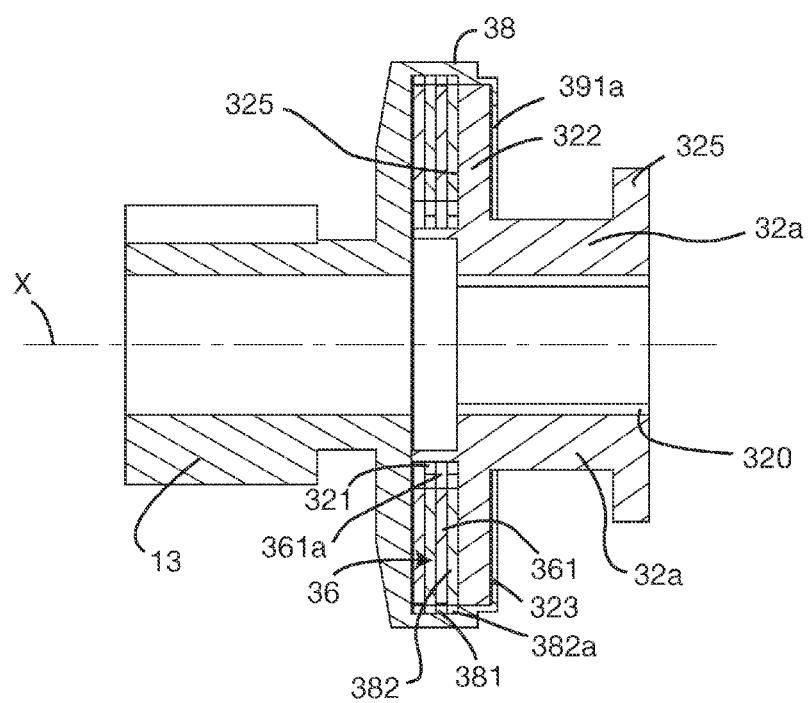
FIG. 5 shows a section view of a second example of a coupling system of a booster starter motor, according to another mode of completion.

According to another mode of completion, pusher 391 and puller 392 are two separate parts. FIG. 5 shows the assembly of driver 32a, disk 361, 382 and pinion 13, according to one second example of coupling system 30 corresponding to this other mode of completion. The second mode of completion of coupling system 30 is structurally and functionally identical to the first coupling system 30 described above, except as regards the elements described below. The parts, systems or devices identical to the described example of the first mode of completion have the same reference number.

In coupling system 30 shown on FIG. 5, pusher 391a is a washer which is fixed, by welding for example, onto a part of traction flange 38 of pinion 13, folded behind shoulder 322 of driver 32a.

Driver 32a also comprises its shoulder 322, a second shoulder 325 which acts as puller 325. Thus, as opposed to the first mode of completion described, in which puller 392 is connected to traction flange 38, in this example of mode of completion, puller 325 is connected to driver 32a.

Thus, at the time of the withdrawal phase of pinion 13, fork 27 having both its ends in the channel between the two shoulders 322, 325 of driver 32a, shifts only the latter backwards at first by means of second shoulder 325 until it reaches its uncoupled position. Finally, secondly, first shoulder 322 of driver 32a pushes pusher 391a by means of its support side 323, and therefore simultaneously shifts traction flange 38 and pinion 13 backwards until they reach their rest position. Thus, as opposed to the first example described, the withdrawal phase takes place while disks 361, 382 are not compressed. In effect, in the example previously described, during this withdrawal phase, disks 361, 382 are compressed particularly by the resistant torque due to the withdrawal of driver 32 on drive shaft 15.

This difference has the advantage that the teeth of pinion 13 leave the teeth of toothed wheel 100 while having pinion 13 uncoupled from driver 32a.

Figure 6:
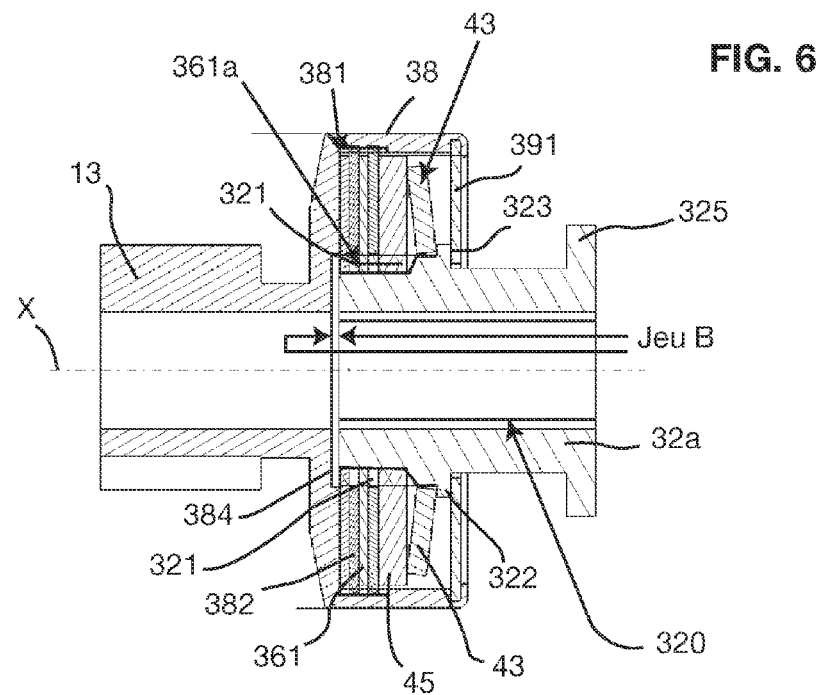
FIG. 6 shows a section view of a third example of a coupling system of a booster starter motor according to the other mode of completion, comprising another mode of completion of the clutch device.

According to another mode of completion, a part forming a spring is fitted between the rear disk 361, 382 and first shoulder 322 in order to ensure a function of limiting the torque to coupling system 30. FIG. 6 shows driver 32a, disks 361, 382, pinion 13 and booster assembly according to a third example, corresponding to this other mode of completion.

The third example is structurally and functionally different to this second example described as regards the elements described below. The parts, systems or devices identical to the first or second example described have the same reference number.

Multidisc clutch device 36 also comprises a spring washer 43 also referred to as an elastic washer known also as 'Belleville®'. The clutch device 36 also comprises a rigid washer 45. Both washers 43, 45 are situated between first shoulder 322 of driver 32a and the rear disk (also referred to as the last disk). This spring washer 43 is supported on the pressure side 324 of the first shoulder 322 and a rigid washer side 45 having its other side facing the last disk. The spring washer 43 enables the force applied to disks 361, 382 in order to compress them to be predetermined. Rigid washer 45 makes it possible to spread this predetermined force over the entire surface of the disks, particularly on the last disk.

The principle of operation of this torque limiter will now be described.

The forward displacement of driver 32a elastically deforms this spring washer 43. This elastic deformation applies an axial force on rigid washer 45. This axial force increases in accordance with the elastic deformation of spring washer 43. It is possible to know the axial force exercised on disk 361, 382 in accordance with the distance of forward travel of driver 32a and the knowledge of the characteristics of spring washer 43. It is therefore also possible to know the maximum transmissible torque of driver 32a on pinion 13 without sliding between inner disks 361 and outer disks 382 in accordance with the elastic deformation of spring washer 43.

This mode of completion therefore makes it possible to limit the maximum torque transmittable between driver 32a and pinion 13. This maximum torque is preferably predetermined in such a way that it exceeds what is necessary to start up the motor by explosion and below that which may give rise to breakage at the time of jerk.

Thus, by knowing the characteristics of disks 361, 382 and elastic washer or spring 43, it is possible to predetermine the maximum transmissible torque without sliding, by adjusting the maximum elastic deformation. The limitation of elastic deformation may be adjusted by limiting the distance of forward travel of driver 32a in relation to pinion 13. This distance of forward travel corresponds to play B, shown on FIG. 6, between a driver stop 384 on traction flange 38 and the front side of driver 32a in uncoupled position. In this case, the driver stop 384 that limits the shift of driver 32a is positioned on traction flange 38 between the rear end of pinion 13 and the front end of driver 32a.

As a variant, spring washer 43 is replaced by one or more springs, for example spiral.

According to another example, spring washer 43 is supported directly on the rear disk. In this example, the device therefore has no washer 45.

Figure 7:
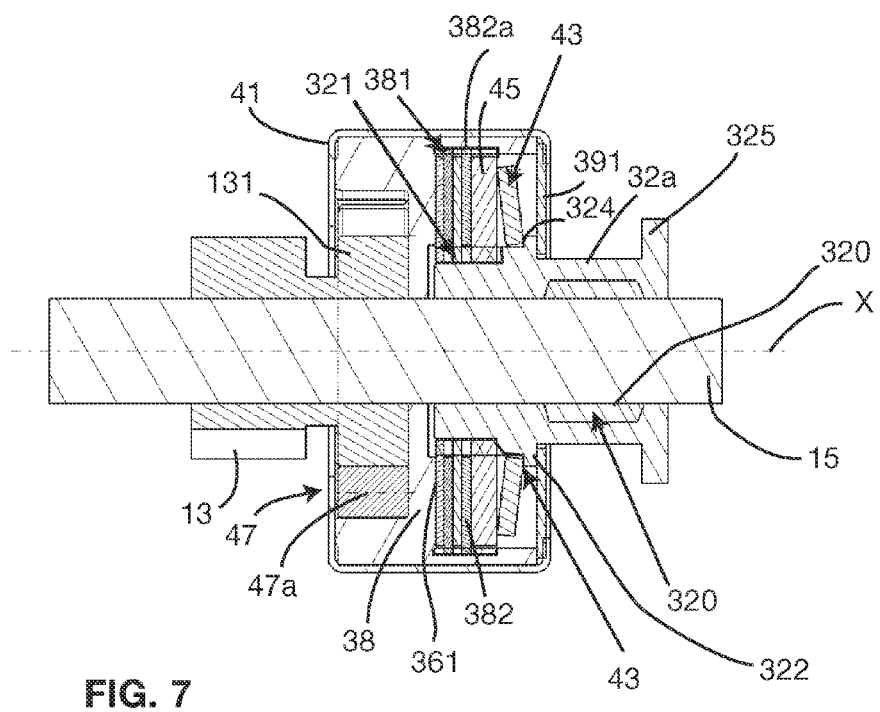
FIG. 7 shows a section view of a fourth example of a coupling system of a booster starter motor according to the other mode of completion, comprising another mode of completion of the clutch device.

According to another mode of completion, coupling system 30 comprises a free wheel roller device 47 housed between traction flange 38 and pinion 13. FIG. 7 shows the driver 32a, disk 361, 382, pinion 13 and booster assembly according to a fourth example corresponding to this other mode of completion.

The fourth example is structurally and functionally different to the third example described, as regards the elements described below. The parts, systems or devices identical to the third example described have the same reference number.

Coupling system 30 also comprises a free wheel roller device 47 comprising rollers 47a between pinion 13 and traction flange 38. Contrary to the other modes of completion described, traction flange 38 is a separate part from pinion 13. Pinion 13 comprises a cylindrical path 131 on its rear end which is part of the free wheel roller device 47. The traction flange 38 comprises a hollow part on the front which is part of the free wheel roller device 47.

This hollow part houses rollers 47a, springs (not shown) and a path of pinion 131. Each roller 47a is fitted between path of pinion 131 and a working ramp on a surface of the hollow part. The rollers 47a may each be displaced into a corresponding working ramp between a so-called working position and a so-called free position. The working ramps, springs and rollers are regularly distributed at an angle around the path of pinion 131.

Each roller 47a is associated with a spring (not shown) which forces roller 47a to be in the working position. In the working position, roller 47a couples traction flange 38 in rotation to the path of pinion 131, being jammed between the working ramp and the outer surface of path of pinion 131.

When driver 32a is coupled to traction flange 38 and the electric motor is on, driver 32a drives pinion 13 in rotation by means of clutch device 36, traction flange 38 and free wheel 47 (that is, by means of the rollers in working position).

During start-up, there is an overspeed phase (where the crankshaft has a rotation speed in excess of the rotation speed of drive shaft 15), particularly during the phase of decompression of the pistons chamber of the thermal motor. At the time of this overspeed phase, the path of pinion 131 shifts rollers 47a in the working ramp towards a space of gradual enlargement. Each roller 47a is shifted by compressing their corresponding spring until it reaches the free position. The term free position signifies the fact that rollers 47a no longer allow the coupling of the path of pinion 131 to traction flange 38, due to the fact that they are no longer jammed between the latter.

The free wheel roller device 47 therefore makes it possible to ensure that the thermal motor does not drive rotor 3 of the electric motor of starter motor 1, in rotation in the start-up direction. Thus, the fact of placing a free wheel 47 between pinion 13 and driver 32a makes it possible to keep traction flange 38 in gear with driver 32a so that the rotation speed of pinion 13 is at least equal to the rotation speed of drive shaft 15, and also to decrease wear on the friction plates.

This free wheel roller device 47 is particularly effective, when starting up the thermal motor and in overspeed phase, in order to decrease the start-up time. In effect, after this overspeed phase, the thermal motor may go on to a compression phase in which the crankshaft slows down. Throughout this deceleration, starter motor 1 gives back torque and speed to the crankshaft. However, with coupling system 30 of FIG. 6, during this deceleration, before the starter motor gives back the torque, the rotation speed of pinion 13 is momentarily below the rotation speed of drive shaft 15. In effect, this moment corresponds to the forward travel of driver 32a in order to activate the clutch.

In the case with a free wheel, throughout the overspeed, driver 32a remains in gear with traction flange 38, which turns at the same speed as drive shaft 15. Thus the moment of forward travel described previously is zero. Thus, as soon as pinion 13 turns at the rotation speed of drive shaft 15, pinion 13 is driven in rotation by the electric starter motor. This mode of completion therefore allows the thermal motor to start up more quickly.

This free wheel 47 is therefore particularly advantageous in the case of a coupling system 30 comprising a clutch device 36, as described in the third example, that is, comprising a torque limiter. In effect, the clutch time (moment of forward travel of the driver) is slower than without the torque limiter due to the fact of the effort to be applied in order to elastically deform spring washer 43. The coupling system 30 without spring washer 43 therefore has a faster clutch time than clutch device 36 with torque limiter.

The forward travel of pinion 13 from rest position to engaged position in order to start up a thermal motor functions in the same way as the example shown on FIG. 6, particularly in the balancing phase, at the time of synchronisation since free wheel 47 is in working position.

According to another example of this mode of completion, free wheel 47 is not a roller but a catch.

According to another example of one of the previous modes of completion, disks 361 and 382 comprise notches and the driver and traction flange 38 of the sprockets.

According to one example of one of the previous modes of completion, the first shoulder 322 is a ring fitted tightly onto the outer surface of the driver.

According to an example of one of the previous modes of completion, the booster is a shoulder on traction flange 38 that moves away from the X axis of drive shaft 15. In this example, fork 27 is shorter than in the other examples and may not be in direct contact with the driver.

According to an example of one of the previous modes of completion, the displacement system of pinion 13 pulls pinion 13 to the active position and pushes pinion 13 to the rest position. In this example, the mobile part of the displacement system that makes it possible to shift pinion 13 may, for example, comprise a magnetic part with a front surface that has a part connected at least in transfer of pinion 13.

Figure 8:
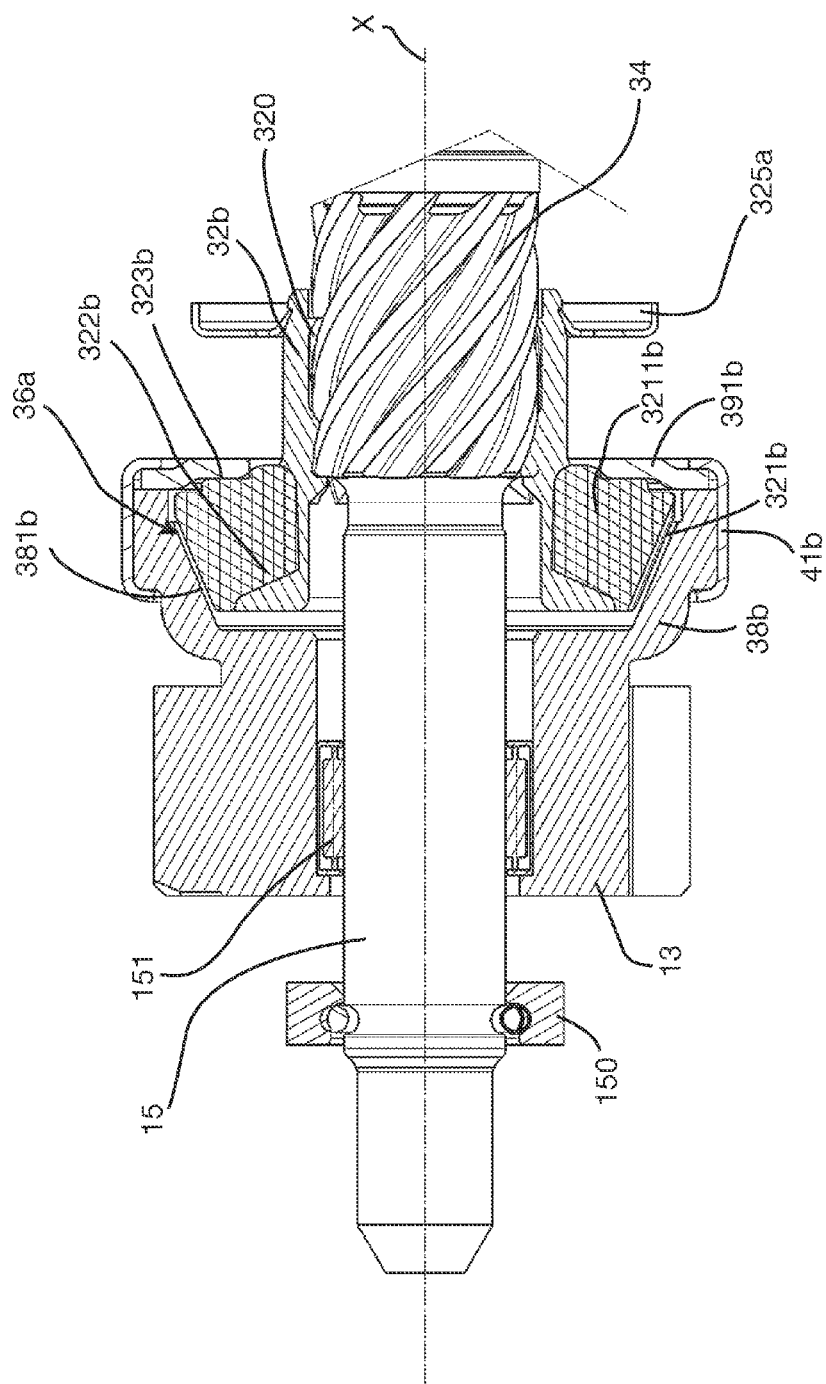
FIG. 8 shows a section view of a fifth example of another mode of completion of the coupling system of the booster starter motor according to the other mode of completion, comprising a friction cone clutch device.

According to another mode of completion, coupling system 30 comprises a conical friction clutch device 36a. FIG. 8 shows a section view of a drive shaft assembly 15, driver 32b, disk 361, 382, pinion 13 and booster according to a fifth example corresponding to this other mode of completion.

The fifth example is structurally and functionally different to the second example described as regards the elements described below. The parts, systems or devices identical to the first or second example described have the same reference number.

Traction flange 38b is integral with pinion 13.

Driver 32b of coupling system 30 comprises a tapered friction surface 321b on its shoulder 322b, and traction flange 38b comprises a complementary tapered surface of contact 381b.

Shoulder 322b, shown on FIG. 8, comprises two zones shaded in two different ways. These two zones correspond to a difference of material. A first zone 3211b has a material adapted to friction. This zone 3211b comprises at least one part of the tapered friction surface 321b. The second zone is of the same material as the rest of driver 32b, particularly t h e part comprising the grooves forming tapping 320.

In this case, tapered friction surface 321b is external and the complementary tapered surface of contact 381b is internal.

In this case, traction flange 38b comprises the tapered surface of contact 381b in a hollow on its rear end. Section view, according to the X axis, the diameter of the tapered surface of contact 381b increases when one moves from its front end to its rear end.

In this case, driver 32b presents the tapered surface of contact 321b on its shoulder 322b in a complementary form. This tapered front side 321b having, section view according to the X axis of drive shaft 15, a diameter which decreases when it is shifted from the rear side of shoulder 322b to its front side.

These two tapered surfaces may therefore be coupled by friction.

These two tapered surfaces are able to cooperate with the other tapered side assembly in order to transmit a torque between traction flange 38b and driver 32b sufficient to start up a thermal motor.

Thus, in this other mode of completion, there is no friction disk. The coupling of driver 32b and pinion 13 is then completed when pinion 13 is blocked in forward transfer, and the tapered surface 321b with tapered surface 381b are sufficiently supported by each other to transmit the start-up torque. This force of support is transmitted by the forward travel of driver 32b as already explained above for the other modes of completion.

This mode of completion may make it possible, in relation to the modes of previous completions, to limit the axial space required for the starter motor.

The rear side of shoulder 322b of driver 32b comprising the side tapered forms the support side 323b which may support pusher 391b connected to flange 38b. In this mode of completion, pusher 391b is a washer fixed on traction flange 38b by means of a holding part 41b with one side facing the support side 323b of shoulder 322b.

The other elements of coupling system 30 are identical and are configured in the same way as the other examples of coupling system: driver 32b always comprises a complementary spiral tapping 320 with thread 34 of drive shaft 15. The puller 325 may be connected to driver 32b or traction flange 38b in the same way as in the examples described above. In this case, on the example shown in FIG. 8, puller 325a is a washer 325a fitted tightly onto the outer surface of driver 32b.

FIG. 8 also shows, to be precise, the link between pinion 13 and drive shaft 15. This link may also be the link between pinion 13 and drive shaft 15 for all the other examples of modes of completion described previously. The elements and principle of operation of this link are described below.

The coupling system 30 may also comprise a needle roller bearing 151 situated between pinion 13 and drive shaft 15, but could also comprise several of them such as two a s shown on FIGS. 1, 3 and 4. This roller bearing (or bearings) 151 is/are fitted tightly into the opening of pinion 13 and designed to slide on drive shaft 15. According to another mode of completion, as shown on FIG. 7, pinion 13 is directly fitted onto drive shaft 15 without a needle roller bearing.

According to another mode of completion, coupling system 30 is fitted between rotor shaft 5 and drive shaft 15. In this mode of completion, drive shaft 15 is fitted by connection in rotation in at least one direction with pinion 13.

According to another mode of completion, coupling system 30 comprises a means of electromagnetic displacement to activate the friction clutch device 36, 36a. For example, the instrument of electromagnetic displacement may comprise a coil fixed in relation to the housing of starter motor 1. This coil is adapted to shift a magnetic part comprising a friction surface, connected in rotation in at least one direction of drive shaft 15, to a friction surface of another part connected in rotation in at least one direction of pinion 13.

According to another mode of completion, the displacement system is of hydraulic type.

According to another mode of completion, the clutch device is monodisk. In this mode of completion, a single disk is provided between disk stop 383 and shoulder 322. The disk may be connected in rotation with traction flange 38 or driver 32b, and the pressure side 324 or the disk stop 383 reciprocally forms the friction surface to ensure the clutch.

It goes without saying that the invention is therefore not limited only to the preferential modes of completion described above.

Particularly, other means of displacement of the driver are possible, as well as other means of displacement of the pinion. The coupling system may comprise any type of clutch device and may be situated anywhere between the electric motor and the pinion. The starter motor may also comprise one or more shafts between the drive shaft and the rotor shaft.

These other modes of completion would not apply outside the framework of the present invention in so far as they result from of the claims hereafter.

The invention claimed is:

1. A starter (1) of a thermal motor, comprising:
an electric motor comprising:
a rotor shaft (5) comprising a longitudinal axis (X),
a rotor (3) fitted onto the rotor shaft (5),
a stator (7) disposed around the rotor (3),
the rotor (3) rotationally driving the rotor shaft (5) around the longitudinal axis (X) in a direction of rotation of start-up when the electric motor is on;
a drive shaft (15) configured to be drivingly coupled to the rotor shaft (5) through a gear reducer system (17) and rotatable around the longitudinal axis (X);
a pinion (13) rotatably fitted on the drive shaft (15) for rotation around the longitudinal axis (X) of the drive shaft (15), the pinion (13) being rotatable relative to the drive shaft (15) and axially moveable relative to the drive shaft (15) along the longitudinal axis (X) between a rest position and an active position;
a coupling system (30) for drivingly coupling the rotor shaft (5) to the pinion (13) so as to transmit torque therebetween, the coupling system (30) configured to pass from an uncoupled state to a coupled state and vice versa, wherein:
in the coupled state, the rotor shaft (5) is drivingly connected in the direction of rotation of start-up to the pinion (13), and
in the uncoupled state, the pinion (13) is drivingly disconnected in both directions of rotation of the rotor shaft (5); and
a displacement system axially shifting the pinion (13) and the coupling system (30) relative to the drive shaft (15) along the longitudinal axis (X) toward the active position of the pinion (13) when the electric motor is off.

2. The starter (1) according to claim 1, wherein:
the pinion (13) is rotatably mounted on the drive shaft (15),
the drive shaft (15) is drivingly connected to the rotor shaft (5), and
the coupling system (30) in the uncoupled state rotatably disconnects in both directions the pinion (13) from the drive shaft (15), and in the coupled state drivingly connects the pinion (13) to the drive shaft (15) in the direction of rotation of start-up.

3. The starter (1) according to claim 2, wherein the coupling system (30) is configured to pass from the uncoupled state to the coupled state when the axial movement of the pinion (13) along the longitudinal axis (X) relative to the rotor shaft (5) is blocked and the electric motor is on.

4. A starter (1) of a thermal motor, comprising:
an electric motor comprising:
a rotor shaft (5) comprising a longitudinal axis (X),
a rotor (3) fitted onto the rotor shaft (5), and
a stator (7) disposed around the rotor (3),
the rotor (3) rotationally driving the rotor shaft (5) around the longitudinal axis (X) in a direction of rotation of start-up when the electric motor is on
a drive shaft (15) configured to be drivingly coupled to the rotor shaft (5) and rotatable around the longitudinal axis (X);
a pinion (13) rotatably fitted on the drive shaft (15) for rotation around the longitudinal axis (X) of the drive shaft (15), the pinion (13) being axially moveable relative to the drive shaft (15) along the longitudinal axis (X) between a rest position and an active position;
a coupling system (30) for drivingly coupling the rotor shaft (5) to the pinion (13) so as to transmit torque therebetween, the coupling system (30) configured to pass from an uncoupled state to a coupled state and vice versa, wherein:
in the coupled state, the rotor shaft (5) is drivingly connected in the direction of rotation of start-up to the pinion (13), and
in the uncoupled state, the pinion (13) is drivingly disconnected in both directions of rotation of the rotor shaft (5); and
a displacement system configured to axially shift the pinion (13) and the coupling system (30) relative to the drive shaft (15) along the longitudinal axis (X) toward the active position of the pinion (13) when the electric motor is off;
the pinion (13) rotatably mounted on the drive shaft (15);
the drive shaft (15) drivingly connected to the rotor shaft (5); and
the coupling system (30) in the uncoupled state rotatably disconnecting in both directions the pinion (13) from the drive shaft (15), and in the coupled state non-rotatably connecting the pinion (13) to the drive shaft (15) in the direction of rotation of start-up;
the coupling system (30) configured to pass from the uncoupled state to the coupled state when the axial movement of the pinion (13) along the longitudinal axis (X) relative to the rotor shaft (5) is blocked and the electric motor is on
the coupling system (30) comprising:
a driver (32, 32a, 32b) axially moveable from an uncoupled position to a coupled position relative to the pinion (13) along the longitudinal axis (X) of the drive shaft (15) when the electric motor is on,
a shifting device to axially shift the driver (32, 32a, 32b) relative to the pinion (13) along the longitudinal axis (X), and
a clutch device (36, 36a) configured to non-rotatably couple the drive shaft (15) to the pinion (13),
wherein the driver (32, 32a, 32b) acts on the clutch device (36, 36a) so as to non-rotatably couple the drive shaft (15) to the pinion (13) when the axial movement of the pinion (13) along the longitudinal axis (X) relative to the drive shaft (15) is blocked.

5. The starter (1) according to claim 4, wherein the displacement system includes an electromagnetic device.

6. The starter (1) according to claim 4, wherein the shifting device to axially shift the driver (32, 32a, 32b) comprises:
a part of the drive shaft (15) having a thread spiral (34),
a tapping spiral (320) complementary to the thread spiral (34) on the driver (32, 32a, 32b), the cooperation of the tapping spiral (320) and the thread spiral (34) causing the driver (32, 32a, 32b) to be spirally displaced relative to the drive shaft (15) along the longitudinal axis (X) from an initial position to a final position.

7. The starter (1) according to claim 6, wherein the clutch device is a friction clutch device (36, 36a) comprising:
at least one first friction part (361, 322b) non-rotatably connected to the driver (32, 32a, 32b), the at least one first friction part (361, 322b) comprising at least one first friction surface (361b, 321b),
at least one second friction part (382, 38b) non-rotatably connected to the pinion (13), the at least one second friction part (382, 38b) comprising at least one second friction surface (382b, 381b) facing the first friction surface (361b, 321b) of the first friction part (361, 322b),
wherein at the state of coupling, the driver (32, 32a, 32b) is in coupled position and applies a force on the first friction part (361, 322b) against the second friction part (382, 38b) so that the drive shaft (15) transmits rotational movement to the pinion (13), and
wherein, in the uncoupled state, the driver (32, 32a, 32b) is in uncoupled position, allowing the at least one first friction surface (361b, 321b) of the first friction part (361, 322b) to rotate relative to the at least one second friction surface (382b, 381b) of the second friction part (382, 38b) in order to uncouple the torque from the drive shaft (15) to the pinion (13).

8. The starter (1) according to the claim 7, wherein:
the first friction part (361) is an inner disk (361) non-rotatably connected with the driver (32, 32a) and axially moveable relative to the driver (32, 32a) along the longitudinal axis (X) of the drive shaft (15),
the second friction part (382) is an outer disk (382) situated inside a traction flange (38) connected in a direction of rotation with the pinion (13), the outer disk (382) being non-rotatably connected with the traction flange (38) and axially moveable along the longitudinal axis (X) of the drive shaft (15) relative to the pinion (13).

9. Starter (1) according to claim 7, in which a friction clutch device is a conical clutch (36a), in which, the first and the second friction surface (321b, 381b) are two complementary tapered surfaces.

10. Starter (1) according to claim 9, in which
the first part a friction (322b) is fitted on the driver (32b) and forms a shoulder (322b) on the latter such that the first friction surface is an outer surface (321b), and
the second friction part (38b) surrounds the first friction part in such a way that the second friction surface (381b) is an inner surface surrounding the first friction part.

11. The starter (1) according to claim 1, wherein the displacement system further comprises a contactor (23) and a fork (27), the contactor (23) being able to activate the fork (27) to transfer the pinion (13) from the initial position to the active position.

12. The starter (1) according to claim 11, further comprising a part (39) connected in transfer to the pinion (13) comprising a part forming a booster (391, 391a, 391b), able to be in contact with part of the displacement system in order to be pushed by the latter.

13. The starter (1) according to claim 12, wherein the driver (32, 32a, 32b) comprises a shoulder (322, 322b) situated between the pinion (13) and the booster (391, 391a, 391b), wherein the displacement system is configured to move the driver (32, 32a,32b) by the booster part (391, 391a, 391b) and the shoulder (322, 322b), and wherein the pinion (13), booster (391), driver (32) and displacement system are arranged so that the displacement system of the pinion does not activate the coupling system (30 from the uncoupled state to the coupled state when the displacement system shifts the pinion (13) from the rest position to the active position.

14. The starter (1) according to claim 13, wherein the shoulder (322, 322b) situation between the pinion (13) and the booster (391, 391a, 391b) is the shoulder forming the second friction part.

15. Starter (1) according to claim 12, in which the part (39) also comprises a second part forming a puller (392) forming a channel with the booster (391) in which is inserted at least one end of the fork, the puller (392) allowing the system of displacement to shift the pinion (13) to its initial position.

16. Starter (1) according to claim 14, in which the driver (32a) comprises a second shoulder forming a puller (325) which forms a channel with the booster (391) in which is inserted at least one end of the fork (27), the puller (325) which makes it possible to shift the pinion (13) to its initial position.

17. Motor vehicle comprising a starter motor (1) according to claim 16.

18. The starter (1) according to claim 1, wherein the displacement system comprises a contactor (23), an electromagnetic device (26) and a fork (27) displaceable by the electromagnetic device (26), and wherein the contactor (23) is configured to activate the fork (27) to transfer the pinion (13) relative to the drive shaft (15) from the initial position to the active position.

* * * * *